June 9, 1925. 1,541,631
J. S. DUFFY
MOSAIC SURFACE AND METHOD OF MAKING IT
Filed Oct. 23, 1922 2 Sheets-Sheet 1
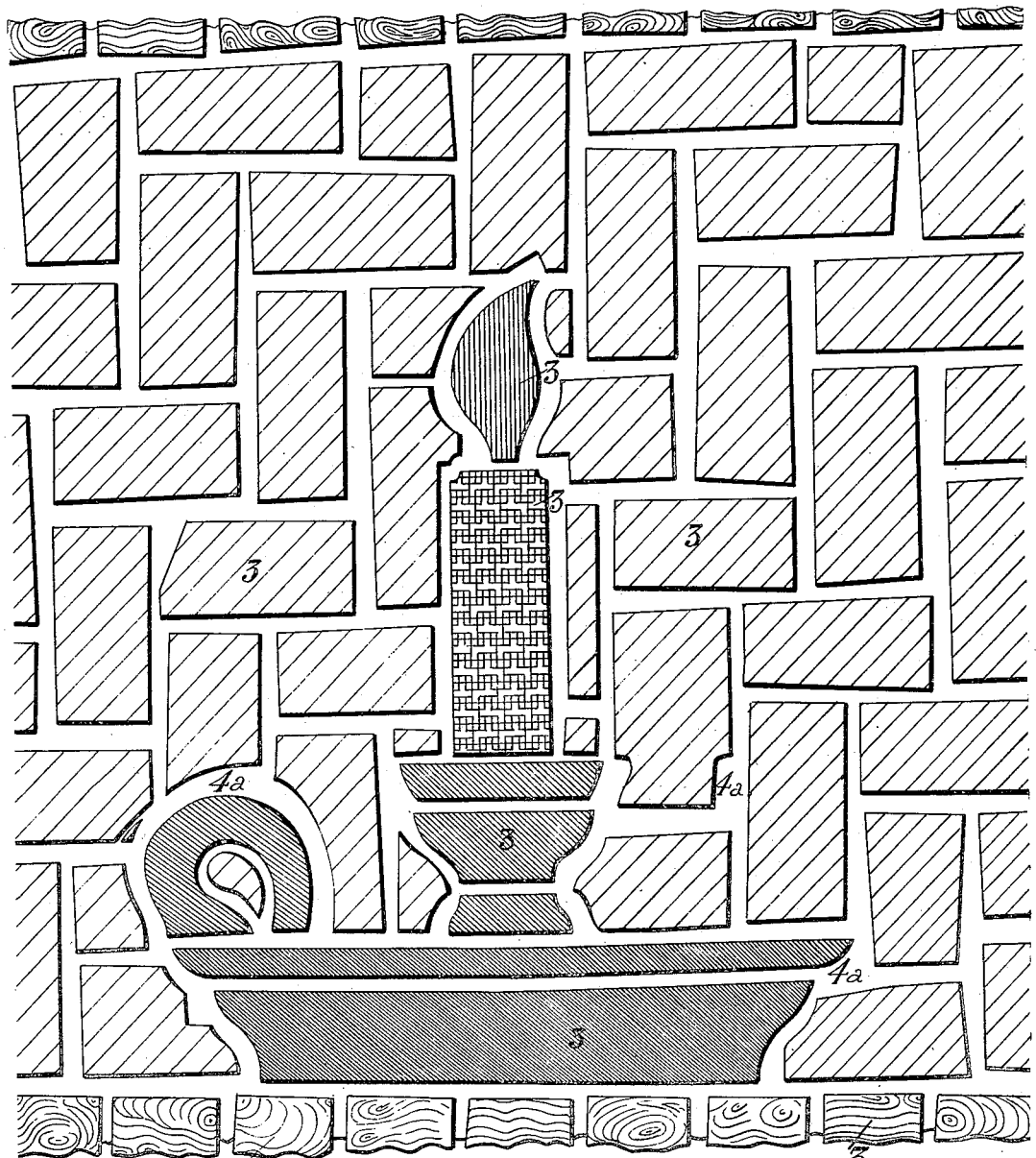
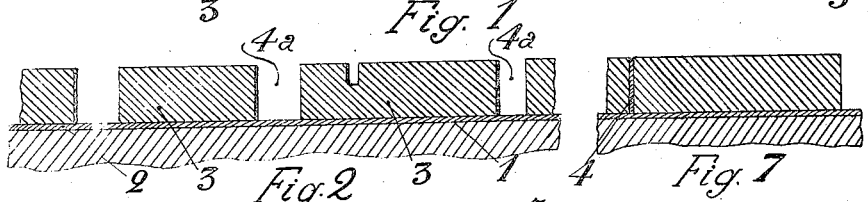
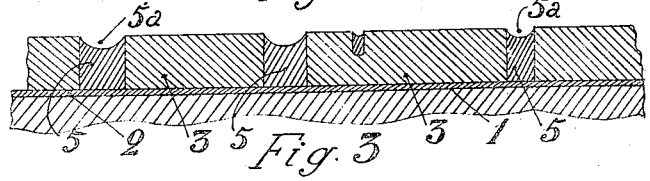
INVENTOR
James S. Duffy
BY
W. J. Bissing
ATTORNEY June 9, 1925. 1,541,631
J. S. DUFFY
MOSAIC SURFACE AND METHOD OF MAKING IT
Filed Oct. 23, 1922   2 Sheets-Sheet 2

INVENTOR
James S. Duffy
BY
ATTORNEY

Patented June 9, 1925.

1,541,631

UNITED STATES PATENT OFFICE.

JAMES S. DUFFY, OF RAHWAY, NEW JERSEY, ASSIGNOR TO LINOMOSAIC CO. INC., OF NEW YORK, N. Y., A CORPORATION OF NEW YORK.

MOSAIC SURFACE AND METHOD OF MAKING IT.

Application filed October 23, 1922. Serial No. 596,233.

*To all whom it may concern:*

Be it known that I, JAMES S. DUFFY, a citizen of the United States, residing at Rahway, county of Union, State of New Jersey, and whose post-office address is Lake and Jefferson Avenues, Rahway, New Jersey, have invented certain new and useful Improvements in Mosaic Surfaces and Methods of Making Them, of which the following is a specification.

This invention relates to a method of assembling and joining together irregular shaped pieces of linoleum or other resilient or plastic materials so as to form a mosaic whereby the units or pieces are separated from and do not touch each other when assembled, but are connected together by joints which fill the spaces between the pieces, the joints themselves consisting of a plastic cement which connects the pieces, helps also to bind them to the surface being decorated and contributes to the design formed by the mosaic.

In accordance with the invention, the first step consists in assembling and cementing the irregular pieces, which form the design, upon the surface, spacing them apart and permitting the cement to set. This forms the body of the design of the mosaic.

The second step in the method consists in thereafter joining the pieces together in a continuous and unbroken sheet by means of a plastic cement, forming the joints of substantial but irregular width, the cement forming the joints adhering to the adjoining pieces, the joints becoming similar to the linoleum when set, resilient and springy. The joints thus become part of the ornamentation and also help to hold the mosaic pieces together and to the surface being decorated.

The invention also consists in the article of manufacture, namely, a decorative flooring, or wall or other decorative surface resulting from the assembling of the irregular pieces of linoleum and the provision of the plastic joints between the pieces. In accordance with the invention the artist is enabled to carry out and preserve his designs made from preformed linoleum pieces of any shape, it being flexible and easy to cut out and shape with ordinary wood working tools or knives. The pieces in their preformed condition when cemented together form a continuous and unbroken blanket or cover for the floor, wall or surface to which it is applied.

Ceramic and stone mosaic have been laid by connecting the pieces by metal dividing strips or locking strips or cement, but attempts to lay mosaic linoleum pieces have not been successful except where they were manufactured in advance with butt joints or interlocking abutting joints, which restricts the choice in the laying of the desired design and deprives the product of its hand made artistic quality. In accordance with applicant's invention the artistic quality and hand made effect are preserved and the linoleum mosaic is laid without detracting from the artist's design, at the same time maintaining the durable, waterproof quality of the mosaic and of the joints.

Referring now to the drawings:

Fig. 1, illustrates a plan view in full scale of a portion of linoleum mosaic laid in accordance with the invention, the shading representing different colors.

Fig. 2, is a vertical section on an enlarged scale showing the first step in the method of placing the mosaic.

Fig. 3, is a vertical section on an enlarged scale showing the second step in placing the mosaic, namely, laying the joints.

Fig. 7 is a section showing the ordinary way of laying linoleum.

It will be observed in Figs. 1, 2 and 3, that the mosaic is being laid upon a surface 1, the said surface having first received a thin layer 2, of linoleum cement upon which the pieces 3, of the mosaic are applied. These pieces instead of being brought into contact with each other so as to form abutting joints as illustrated at 4, (Fig. 7) are placed a substantial distance apart as at 4^A (Figs. 1–6), the spacing varying in width and being irregular according to the design or conception of the artist.

After the linoleum cement has dried which it usually does in about twenty-four hours and after the mosaic pieces adhere sufficiently to the surface to be decorated, the spaces left between the pieces are filled, to form plastic joints 5, with a plastic cement having the property of adhering to the linoleum. Its nature may be varied but successful results have been attained by using magnesite, the cement consisting of commercial magnesite, magnesium chloride, ground linoleum, ground cork and mineral colors. Successful results have been obtained by using first; a dry mixture of two parts commercial magnesite, one part ground linoleum, one part ground cork, with sufficient mineral coloring matter to produce the color tone desired and then mixing the dry mixture with a weak solution of magnesium chloride, in sufficient quantity to produce a paste workable with an ordinary mason's trowel. Magnesite cement is flexible to a certain degree and has the property of adhering to the linoleum. After filling in the joints with magnesite, the magnesite cement is allowed to partially set and the mosaic is wiped off, thus leaving hollows 5ᴬ in the tops of the joints. This increases the artistic effect.

After the joints have set they cement together the linoleum pieces forming the mosaic and have the following functions and advantages:

The joints instead of being mechanically accurate or true may be of any desired shape, giving a curve or line effect and the mosaic pieces need not be cut with straight or accurate sides to form abutting joints. This increases the artistic character of the mosaic and diminishes the amount of care necessary in shaping the pieces. A certain freedom of positioning the pieces is also allowed to the artist or workman who designs the mosaic or who is laying the decorated surface.

Another function of the construction is that the magnesite cement fills each joint completely, thus forming a network of joints and binds the mosaic pieces to the surface being decorated, at their sides. The edges are held from warping by the joints. Magnesite cement being waterproof preserves the joints from deterioration.

Figure 4:
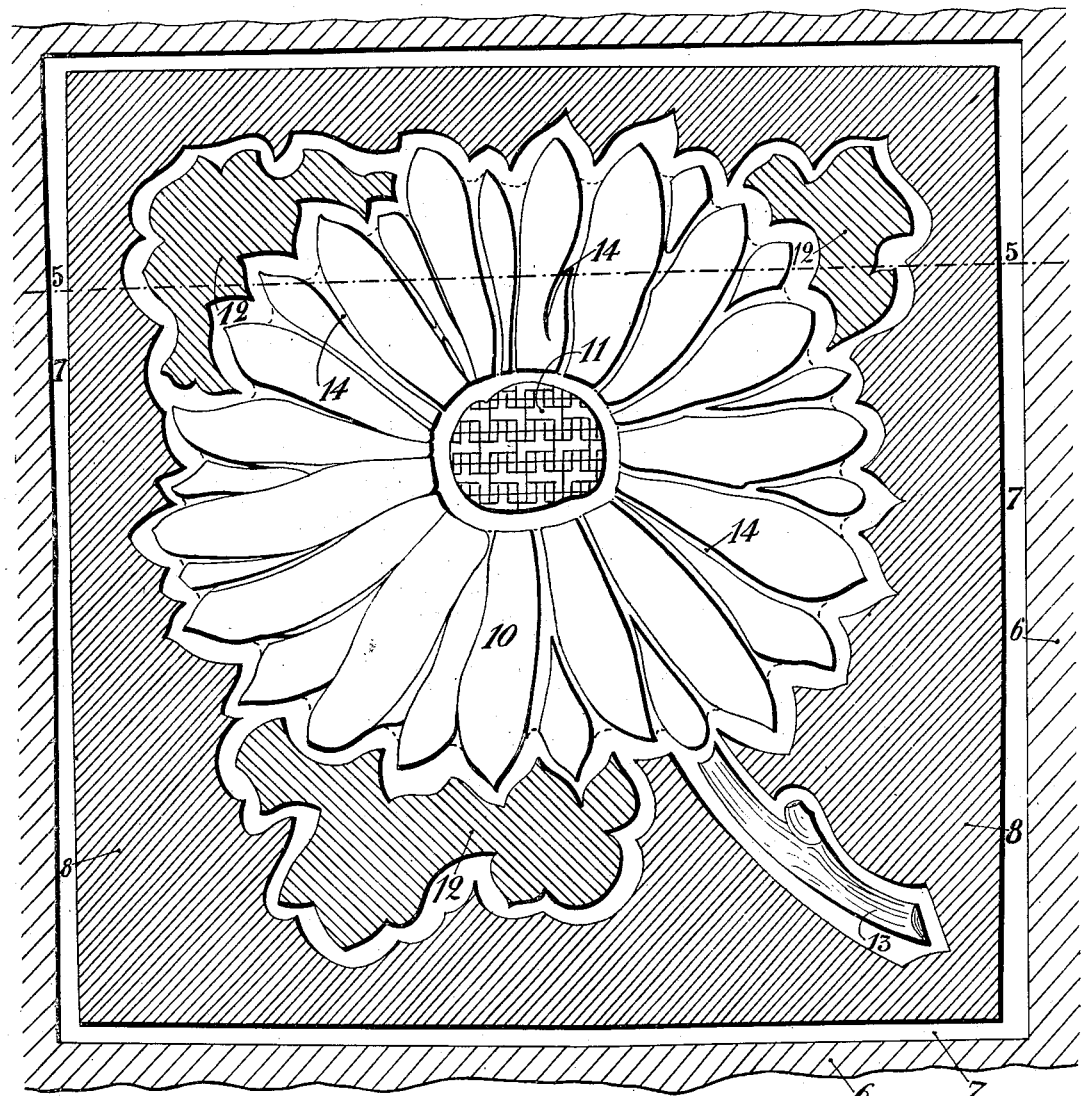
Fig. 4, is a plan view showing the laying of the mosaic utilizing different shapes and illustrating a different form of joint.

Referring to the form illustrated in Fig. 4, in which the whole surface is not divided up into a mosaic, the plain linoleum field 6, may be cut out at 7, so as to provide space for the insertion of a piece of linoleum 8. The linoleum 8, forms a frame for the design. It is cut out and pieces 10, 11, 12 and 13 are cemented to the underlying surface. On the surface of the flower like piece 10, narrow joint-like recesses 14 may be cut, to enhance the effect. The magnesite cement fills the recesses 14 and completes the design.

Figure 5:
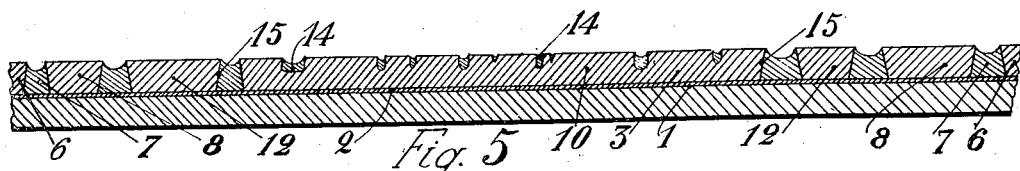
Fig. 5, is a vertical section on line 5—5 of Fig. 4.

In the section shown in Fig. 5, the sides 15 of the mosaic pieces are not cut at right angles to the surface of the pieces, but are slightly inclined with reference thereto. The magnesite cement after filling these joints is thus prevented from escaping from them.

Figure 6:
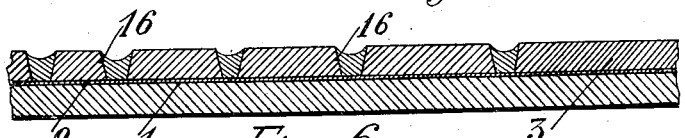
Fig. 6, is a vertical section showing another form of joint.

In Fig. 6, the sides 16 of the joints are cut at an angle to the face, the joint being wider at the top than at the bottom. When filled with cement the holding effect of the mechanical bond produced by the joint network is increased.

In laying the mosaic it may be laid on the surface to be decorated as above explained or the mosaic may be mounted on paper without joints before cementing it to the surface. After so cementing it, the joints are filled with magnesite composition as above described.

The invention enables one to utilize waste linoleum material formed when cutting up linoleum, the waste being made use of by cutting it into pieces from which the mosaic is formed.

Instead of linoleum pieces, the mosaic may be made of cork, rubber, or the like utilizing a magnesite composition for the joint.

Having thus described the invention, it will be understood that changes may be made in carrying the invention into effect without departing from the principle thereof.

What I claim and desire to secure by Letters Patent is:

1. The process of laying mosaic of resilient, flexible material which consists in first applying a cement to the surface to be decorated, then applying pieces of said flexible material in preformed condition to said cement so as to form a design, said pieces leaving open joint spaces between them, permitting said cement to set, and thereafter filling said joint spaces with a plastic cement which adheres to the sides of the pieces and to the surface which is being decorated.

2. The process of laying linoleum mosaic which consists in first applying a linoleum cement to the surface to be decorated, then applying pieces of linoleum in preformed condition to said cement so as to form a design, said pieces leaving open joint spaces between them, permitting said cement to set, and thereafter filling said joint spaces with magnesite cement which adheres to the sides of the pieces and to the surface which is being decorated.

3. The process of laying linoleum mosaic which consists in first applying a cement to the surface to be decorated, then applying pieces of linoleum in preformed condition to said cement so as to form a design, said pieces leaving open joint spaces between them, permitting said cement to set, and thereafter filling said joint spaces with magnesite cement, which adheres to the sides of the pieces and to the surface which is being decorated; rubbing off the decorated surface thereby removing some magnesite cement from the tops of the joints.

4. As a new article of manufacture, a linoleum mosaic comprising a surface to which pieces of preformed linoleum have been cemented so as to form a design, said pieces being spaced apart so as to leave joint spaces between them, said joint spaces containing magnesite cement which form the joints binding the pieces together.

5. A flooring or other surface composed of a number of differently shaped pieces of resilient flexible material assembled to form any desired design or figure and cemented to the surface to be decorated, the said pieces being spaced apart so as to leave irregular joint spaces, the said joint spaces being filled by a plastic cement, the pieces being thereby cemented together in a continuous, unbroken sheet, said joint cement adhering to the adjoining pieces, and to the surface.

In testimony whereof, I have signed my name to this specification.

JAMES S. DUFFY.